United States Patent
Pillai et al.

(10) Patent No.: US 9,490,488 B2
(45) Date of Patent: Nov. 8, 2016

(54) PROCESS FOR THE PREPARATION OF MEMBRANE ELECTRODE ASSEMBLIES (MEAS)

(75) Inventors: Vijayamohanan Kunju Krishna Pillai, Pune (IN); Ulhas Kanhaiyalal Kharul, Pune (IN); Sreekumar Kurungot, Pune (IN); Harshal Dilip Chaudhari, Pune (IN); Sreekuttan Maraveedu Unni, Pune (IN); Bipinlal Unni, Pune (IN); Husain Noman Kagalwala, Pune (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 100 days.

(21) Appl. No.: 14/008,238

(22) PCT Filed: Mar. 29, 2012

(86) PCT No.: PCT/IN2012/000213
§ 371 (c)(1),
(2), (4) Date: Sep. 27, 2013

(87) PCT Pub. No.: WO2012/131718
PCT Pub. Date: Oct. 4, 2012

(65) Prior Publication Data
US 2014/0017595 A1    Jan. 16, 2014

(30) Foreign Application Priority Data
Mar. 29, 2011   (IN) .............................. 869/DEL/2011

(51) Int. Cl.
*H01M 4/88* (2006.01)
*H01M 8/02* (2016.01)
*H01M 8/10* (2016.01)
*H01M 4/92* (2006.01)

(52) U.S. Cl.
CPC ......... *H01M 8/0289* (2013.01); *H01M 4/8814* (2013.01); *H01M 8/1004* (2013.01); *H01M 4/926* (2013.01); *H01M 2008/1095* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 2002/0045085 A1* | 4/2002 | Formato et al. | 429/33 |
| 2007/0134533 A1* | 6/2007 | Tamura | H01M 4/8652 429/483 |
| 2011/0070522 A1* | 3/2011 | Yamauchi et al. | 429/482 |

OTHER PUBLICATIONS

Written Opinion of the International Searching Authority pertaining to International Application No. PCT/IN2012/000213, Sep. 29, 2013.*

* cited by examiner

*Primary Examiner* — Lucas J. O'Donnell
(74) *Attorney, Agent, or Firm* — Abelman, Frayne & Schwab

(57) ABSTRACT

PBI-based MEAs for high temperature Polymer Electrolyte Membrane Fuel Cell (PEMFC) were prepared by direct hot pressing of catalyst layer on Teflon sheets on to both sides of phosphoric acid doped PBI membrane (decal transfer). These MEAs show two times higher performance compared to the MEAs prepared by normal brush coating method on GDL at an operating temperature of 160° C.

4 Claims, 5 Drawing Sheets

Scheme 2

Fig: 1

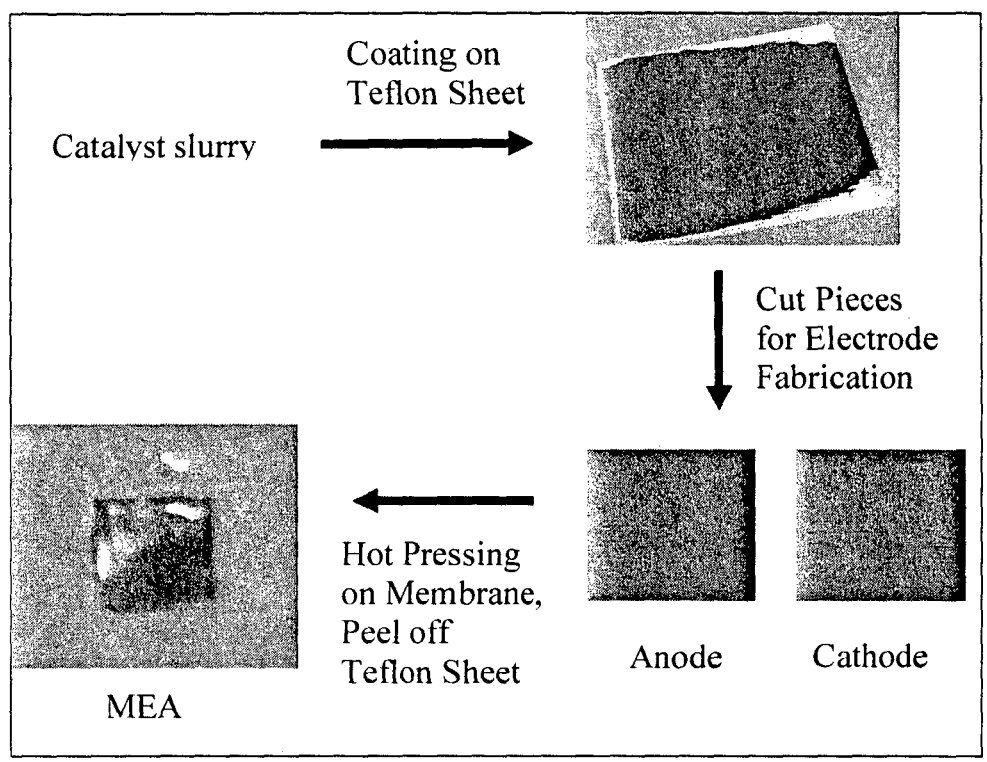
Fig 4, Scheme 1

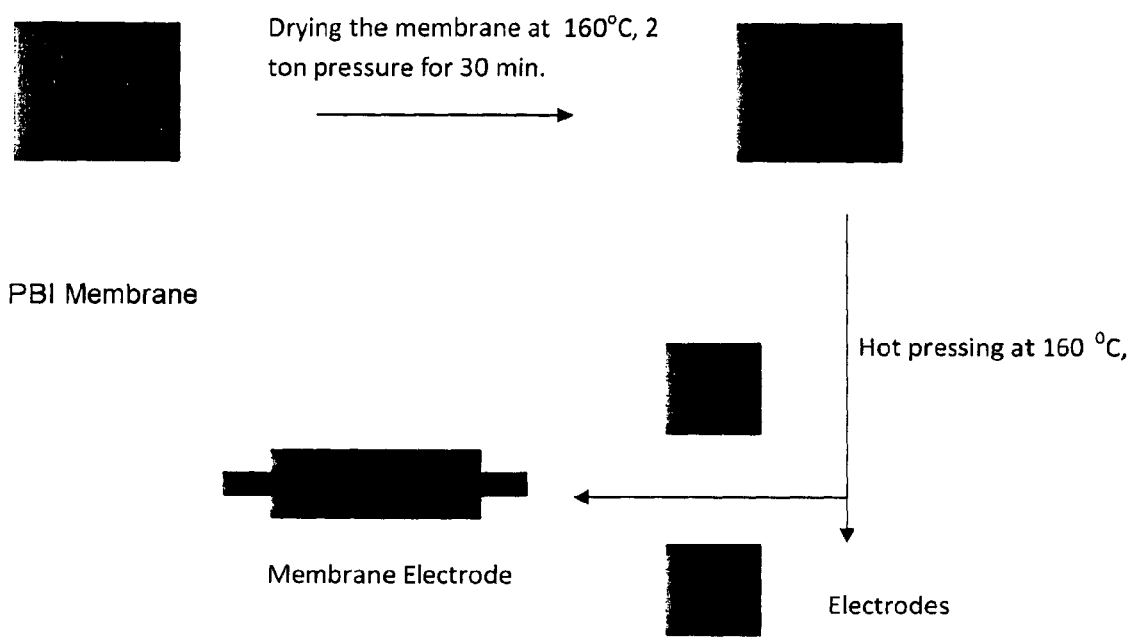
Fig: 5, Scheme 2

PROCESS FOR THE PREPARATION OF MEMBRANE ELECTRODE ASSEMBLIES (MEAS)

RELATED APPLICATIONS

This application is a §371 of PCT/IN2012/000213 filed Mar. 29, 2012, and claims priority from Indian Patent Application No. 869/DEL/2011 filed Mar. 29, 2011, both incorporated by reference in their entirety.

FIELD OF THE INVENTION

The present invention relates to an improved process for the preparation of membrane electrode assemblies (MEAs) useful for a variety of purposes including energy generation, storage and conversion technologies.

BACKGROUND AND PRIOR ART OF THE INVENTION

Membrane electrode assembly (MEA) is an assembled stack of proton exchange membrane (PEM) or alkali ion exchange membrane (AAEM), a catalyst layer and a gas diffusion layer (GDL) used one over another to form a self-contained module. The PEM is sandwiched between two GDLs which have the catalyst embedded in them. These two electrodes serve as the anode and cathode respectively. The PEM is a proton permeable but electrically insulating barrier. This barrier allows the transport of the protons from the anode to the cathode through the membrane but forces the electrons to travel around a conductive external path to the cathode. In this way, the electrodes are electrically insulated from each other. Many companies are in production of both PEMs as well as fuel cells using PEMs. Nafion is the popular PEM manufactured by DuPont [http://www-.electronics.ca/publication/product/directoryand company profiles-%252d Fuel Cells Hydrogen energy and related nanotechnologies. Html].

Platinum is one of the most commonly used catalysts; however other metals like rhodium and ruthenium are also used. Since the high costs of these and other similar materials are still a hindering factor in the wide spread economical acceptance of fuel cell technology, research is being undertaken to develop catalysts that use lower cost materials. The conventional process involved in the preparation of MEA comprises hot pressing of the electrodes onto the PEM [Kim et al. US Patent 20100279196, Swathirajan et al. US Patent 531687, Popov et al. US Patent 2006/0040157 A1]. Commonly used materials for the GDL are carbon coated carbon cloth or Toray carbon fiber paper. The conventional ways of direct transfer of catalyst layers on the proton conducting membranes containing doped phosphoric acid has practical limitations due to the surface wetness caused by phosphoric acid segregation on the membrane surface [L. Qingfeng et al., J. Appl. Electrochem. 31 (2001) 773-779, O. E. Kongstein et al, Energy 32 (2007) 418-422]. On the other hand, the brush coating method of catalyst layer transfer requires unnecessarily high platinum loading (1-2 mg/cm$^2$) to maintain reasonable performance characteristics.

Therefore, the present inventors have come up with a process of direct-transfer of the 'catalyst layer' onto the phosphoric acid doped polybenzimidazole (PBI) membrane by surmounting the limitations possessed by such systems. By following the present invention, the platinum loading can be reduced as low as 0.5 mg/cm$^2$, while retaining high performance characteristics like current density and power density at a given temperature. The present process will be useful to other membranes as well, if the surface wetness causes any practical limitation to effectively generate the catalyst layer by direct transfer.

L. Qingfeng et al., J. Appl. Electrochem. 31 (2001) 773-779.

O. E. Kongstein et al, Energy 32 (2007) 418-422

U.S. Pat. No. 6,946,211 in Example 2 discloses that on to the supporting layer of the carbon paper by tape-casting was applied a mixture of 40 wt % Pt/C catalyst powder and 60 wt % FBI from a 3 wt % polymer solution in dimethylacetamide. The platinum loading in the catalyst layer is 0.45 mg/cm.sup.2. After drying at 130 .degree. C. for 10 minutes, the electrode was impregnated with a mixed acid of 65 wt % phosphoric acid and 35 wt % trifluoroacetic acid. The amount of impregnated phosphoric acid is related to the FBI content in the catalyst layer of the electrode, in a molar ratio of 14 to 1. From the impregnated electrodes and acid-doped PBI membranes (doping level 650), a membrane-electrode assembly was made by means of hot-press at a temperature of 150 .degree. C., a pressure of 0.5 bar, and a duration of 12 minutes.

The heating of the phosphoric acid doped PBI membrane at 160° C. to remove the excess phosphoric acid thereby achieving 100% catalyst transfer onto FBI from non-porous support is a technique undisclosed hitherto in prior arts.

OBJECTIVE OF THE INVENTION

The main objective of present invention is to provide an improved process for the preparation of membrane electrode assemblies (MEAs)

Another objective of present invention is to provide a single-step process of membrane-electrode assembly formation by direct transfer of catalyst layer on membrane instead of independently assembling various sub-components like carbon paper, gas diffusion layers, ionomer membrane etc.

SUMMARY OF THE INVENTION

Accordingly, the present invention provides an improved process for the preparation of membrane electrode assemblies (MEAs) comprising:
a) hot pressing the membrane at temperature in the range of 100° C.-160° C., at pressure 1-2 ton pressure for 15-30 minutes
b) hot pressing the membrane as obtained in step (a) again with the electrodes at temperature in the range of 100° C.-160° C. at pressure in the range of 1-2 ton pressure for period in the range of 10-20 minutes
c) directly transferring the catalyst layer from the non-porous support on to the electrolyte membrane as obtained in step (b) during hot pressing to obtain membrane electrode assemblies (MEAs).

In an embodiment of the present invention said membrane used in step (a) is selected from the group consisting of poly benzimidazole (PBI) or perfluroslphonic acid based ionomers.

In an embodiment of the present invention said FBI membrane is doped with phosphoric acid.

In an embodiment of the present invention the electrode materials used for the electrodes are carbon cloth or Toray carbon fiber paper.

In an embodiment of the present invention the non-porous support used in step (c) is selected from the group consisting of Teflon, polyimides, polystyrene or nylon, preferably Teflon.

In an embodiment of the present invention the catalyst layer used in step (c) comprises Pt/carbon.

In an embodiment of the present invention A membrane electrode assembly obtained from process as claimed in claim 1 comprising a) One or more layers of porous gas diffusion layers;

b) FBI or nafion or any proton conducting membrane and c) A catalyst embedded in conducting matrices.

In an embodiment of the present invention the catalyst is Pt/carbon.

BRIEF DESCRIPTION OF THE DRAWINGS

FIG. 5 indicates Scheme 2 represents preparation of PBI-based MEA by present invention.

DETAILED DESCRIPTION OF THE INVENTION

The present invention provides an improved process for the preparation of membrane electrode assemblies (MEAs). The same is achieved by improved Decal process, which holds certain advantages over other conventional methods of Membrane Electrode Assembly (MEA) fabrication such as effective electrolyte-catalyst-reactant 'triple phase boundary', better platinum utilization and offers new opportunities to produce MEAs with low platinum loading, higher electrochemical surface area, lower electrode polarization resistance and better mass-transfer features.

The improved process of the present invention can be used for fabrication of electrodes for Polymer Electrolyte Membrane Fuel Cells (PEMFCs) and supercapacitors, materials for gas sensors and solar cells.

In conventional decal transfer on Nafion membrane, the catalyst slurry is coated on a Teflon sheet. The coated sheet is dried in an oven to remove solvent completely and pieces of required area (4 cm$^2$ in this case) are cut out of it. These are then hot pressed at 130° C. with the membrane sandwiched between them for 90 seconds at a pressure of 1.5 tons and then the Teflon sheets are peeled off to give the MEA. An outline of the process is given in the scheme 1.

Figure 1:
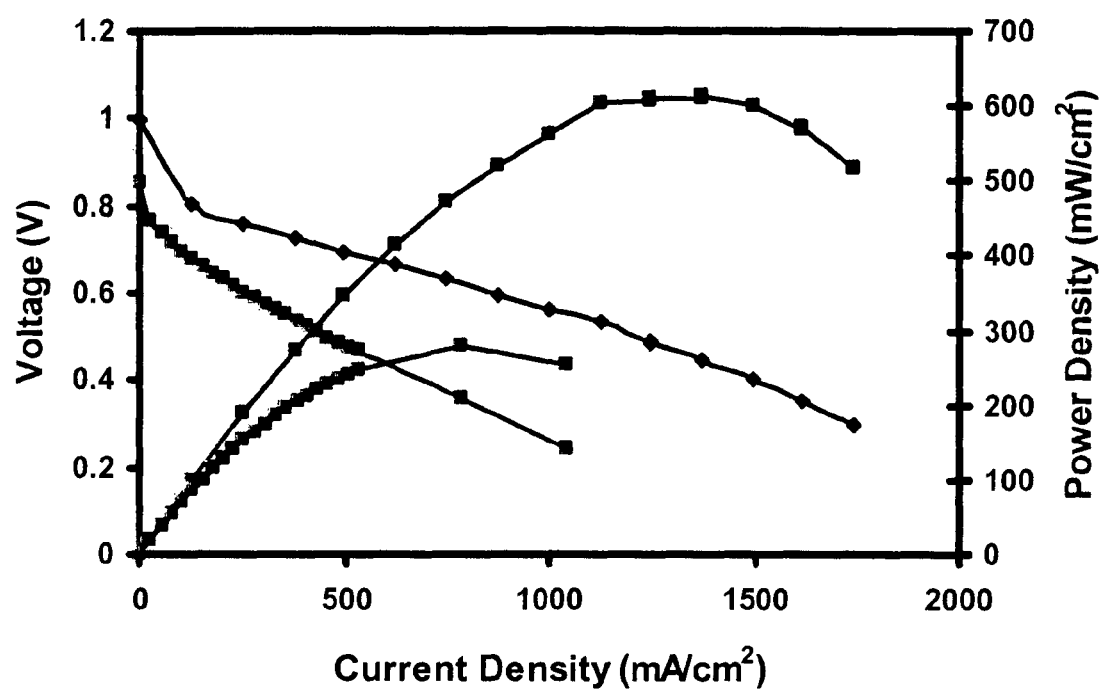
FIG. 1 shows a comparison of the I-V plots of MEAs fabricated by decal and brushing method under identical experimental conditions using hydrogen and oxygen under ambient pressure.

The comparison of decal MEA and MEA prepared by conventional method (brushing method) is provided in table 1. Table 1 show various parameters followed to fabricate Nafion-based MEAs using decal and brushing methods. The advantage of decal process clearly reflects in the enhanced performance obtained during single cell evaluation of both MEAs. The MEA made by decal process gave a higher power density (~600 mW/cm$^2$) in spite of having lower Pt loading as compared to that of the MEA prepared by brushing method (~250 mW/cm$^2$) as shown in FIG. 1.

TABLE 1

Parameters for fabrication of Nafion-based MEAs

| Method | Decal Process | Brushing Method |
|---|---|---|
| Membrane | N1135 | N1135 |
| Catalyst | Pt/C 20 wt % | Pt/C 20 wt % |
| Binder | Nafion | Nafion |
| Area | 4 cm$^2$ | 4 cm$^2$ |
| Platinum Loading | 0.3 mg/cm$^2$ on both sides | 0.5 mg/cm$^2$ on both sides |
| Temperature of hot pressing | 130° C. | 130° C. |
| Pressure of hot pressing | 1.5 ton | 1.5 ton |
| Time of hot pressing | 90 sec | 180 sec |
| Current Density at 0.6 V | 900 mA/cm$^2$ | 250 mA/cm$^2$ |
| Maximum Power Density | 620 mW/cm$^2$ | 280 mW/cm$^2$ |

Therefore, the present invention provides an improved process for the preparation of membrane electrode assemblies, a process which comprises:

a) hot pressing the membrane at 160° C., 2 ton pressure for 30 minutes;

b) hot pressing again with the electrodes, at 160° C., 2 ton pressure for 20 minutes and c) directly transferring the catalyst layer from the non-porous support on to the electrolyte membrane after hot pressing.

The membrane that can be used in the present invention is selected from poly benzimidazole (PBI), perflurosulphonic acid-based ionomers, etc. One preferable membrane is PBI membrane doped with phosphoric acid. The GDLs that can be used in the present invention are carbon cloth or Toray carbon fiber paper.

The non-porous support is selected from Teflon, polyimides, polystyrene, nylon, etc, preferably Teflon. The catalyst layer comprises Pt/Carbon. However, rhodium and ruthenium can also be used.

Thus, a membrane electrode assembly according to the present invention comprises:

a) One or more layers of porous gas diffusion layers b) PBI or Nafion or any proton conducting membrane and c) A catalyst embedded in conducting matrices.

The catalyst embedded in conducting matrices is selected from Pd/carbon and Pt/carbon.

The advantage of using PBI membranes as electrolyte in PEMFCs is that they can be operated at temperatures up to 160° C. At such high temperatures, CO poisoning of Pt catalyst can be minimized, or in some cases, completely eliminated. Compared to Nafion, decal transfer of catalyst on PBI membrane is difficult because the presence of phosphoric acid makes the membrane surface wet and thereby prevents the transfer of catalyst layer on the membrane surface. However, the difficulty in transferring the catalyst has overcome by the process of the present invention.

Accordingly, the inventors have practiced a series of experiments on wet membranes for establishing a most feasible strategy for effectively preparing MEAs from PBI membrane by the decal process, the results of, which are given in Table 2:

TABLE 2

Different test conditions for the fabrication of PBI-based MEAs.

| Surface drying Process | Hot pressing condition | Observation |
| --- | --- | --- |
| Clean the surface using tissue paper | Temp - 130° C.<br>Pressure - 1 ton.<br>Time - 15 min. | Catalyst is not sticking properly |
| Clean the surface using tissue paper | Try to transfer the catalyst by hand | 50% catalyst sticks on the membrane |
| Drying the membrane at 130° C., 1 ton pressure for 15 min. | Temp - 130° C.<br>Pressure - 1 ton<br>Time - 15 m | 80% catalyst sticks on the membrane |
| Drying the membrane at 130° C., 1 ton pressure for 30 min. | Temp - 130° C.<br>Pressure - 1 ton.<br>Time - 15 min. | 90% catalyst sticks on the membrane |
| Drying the membrane at 160° C., 2 ton pressure for 30 min. | Temp - 160° C.<br>Pressure - 2 ton.<br>Time - 20 min. | 100% catalyst sticks on the membrane |

Different conditions of temperature, pressure and time were used in order to achieve a complete transfer of catalyst on PBI membrane surface. After trying many combinations, it was found that a complete transfer could be obtained only when the membrane was initially hot pressed at 160° C., 2 ton pressure for 30 minutes and then hot pressed again, this time with the electrodes, at 160° C., 2 ton pressure for 20 minutes. The additional step of hot pressing the membrane was included to make the membrane surface dry and to facilitate transfer of catalyst. A schematic representation of the process is given by scheme 2.

A comparison of PSI-based MEAs made by both decal and brushing method was done by single cell testing. Table 3 gives the operating conditions as well as the performance for the two MEAs.

TABLE 3

Operating conditions for MEAs made by the two methods.

| | Decal process | Brushing method |
| --- | --- | --- |
| Platinum Loading | 0.15 mgPt/cm$^2$ | 0.15 mgPt/cm$^2$ |
| Operating temperature | 150° C. | 150° C. |
| Binder in Electrode | Nafion | Nafion |
| Current density at 0.6 V | 200 mA/cm$^2$ | 81 mA/cm$^2$ |
| Maximum power density | 240 mW/cm$^2$ | 101 mW/cm$^2$ |

Figure 2:
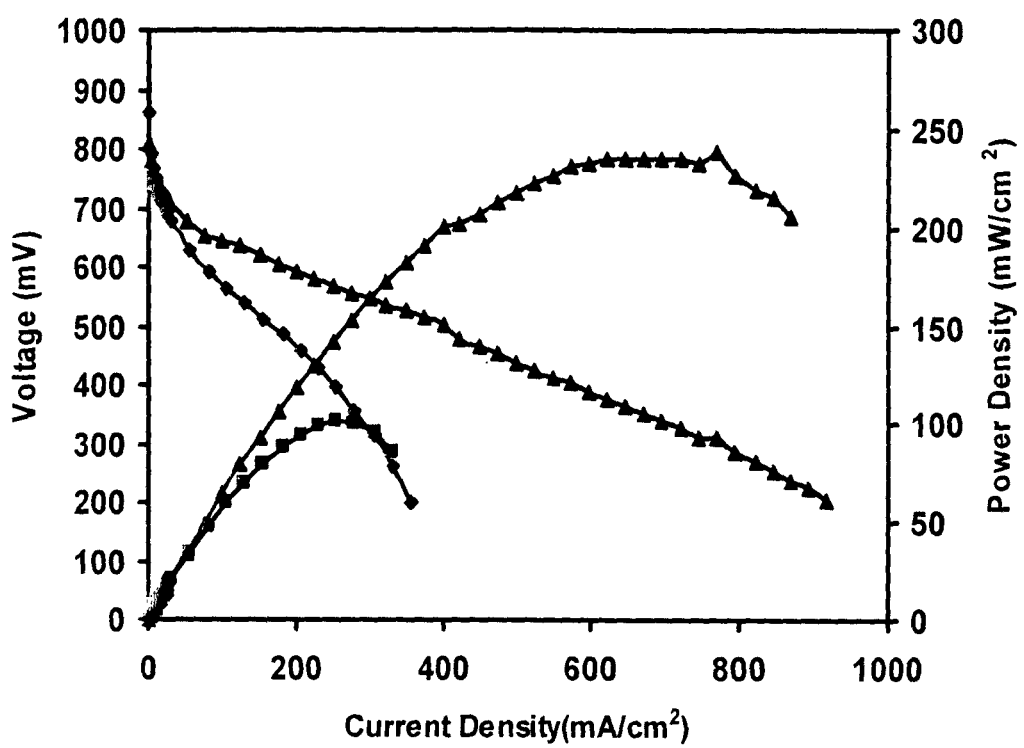
FIG. 2 shows I-V plots of MEAs prepared by decal and brushing method under identical experimental conditions using hydrogen and oxygen under ambient pressure.
Figure 3:
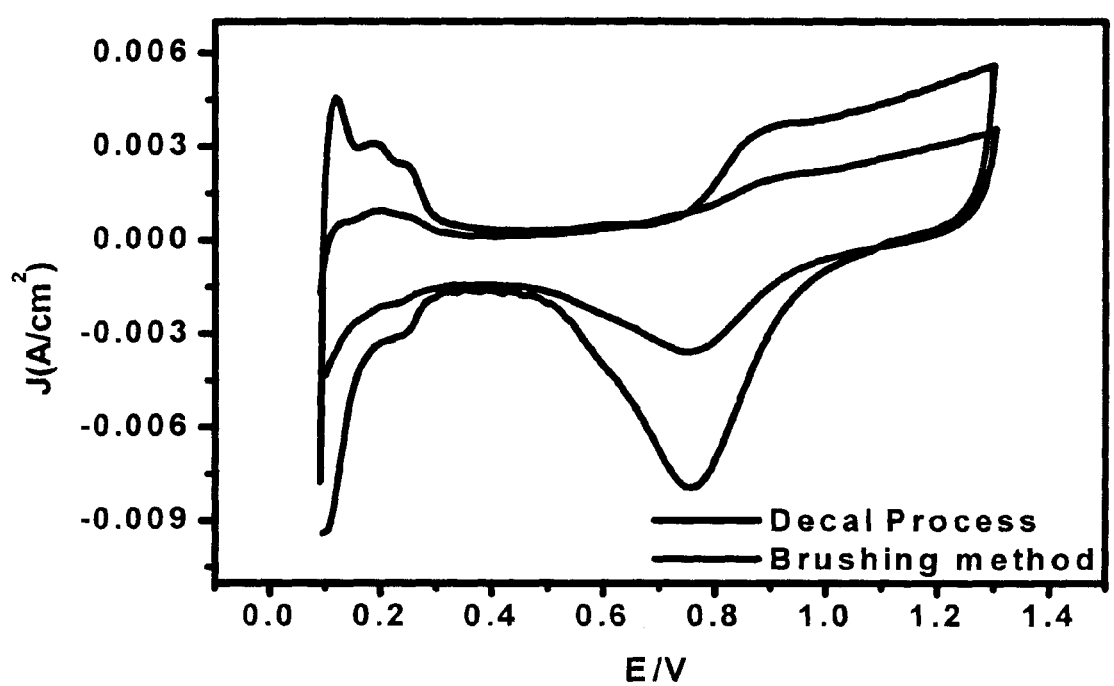
FIG. 3 depicts a comparison of active Pt area (APt) using cyclic voltammetry carried out under identical experimental conditions using both decal and brushing methods FIG. 4 indicates Scheme 1 represents an outline of the process to prepare MEA by conventional Decal transfer.

FIG. 2 shows comparison of I-V plots of PSI-based MEAs using hydrogen and oxygen as reactants. From the figure as well as table 3, it can be inferred that MEAs made by decal process performs better than that prepared by the conventional method. This can be attributed to the higher electrochemical surface area and better Pt utilization in decal process, as shown in solid-state cyclic voltammetry scans (FIG. 3).

The process of the present invention involves transfer of the electrodes directly onto the PBI membrane by direct transfer method. In conventional way of making MEA like casting, brushing, screen printing, spraying, or sputtering, brush coating method is widely used. This leads to catalyst migration into pores and isolated catalyst deposition without any proper connectivity or contact with the membrane or gas diffusion layer, along with improper maintenance of proton and electron conductivity. Direct transfer of dried catalyst layer is a practical solution to prevent the above mentioned issue. However, the wetness caused by the segregated phosphoric acid prevents direct transfer by cold or hot pressing processes. The present invention is a practical remedy to this drawback. 100% dry catalyst layer transfer is possible by adopting a modified technology as disclosed in the present invention.

The process of the current invention deals with a direct transfer of catalyst layer from the non-porous support (eg: Teflon) on to the electrolyte membrane (PBI) by hot pressing. This method addresses material compatibility issues while optimizing the processing conditions and offers advantages such as transfer of dry catalyst layer by surmounting the issues originated by surface wetness and acid segregation on the membrane surface, effective electrolyte-catalyst-reactant 'Triple Phase Boundary', better platinum utilization, new opportunities to produce MEAs with low platinum loading, higher electrochemical surface area, lower electrode polarization resistance, better mass-transfer features and ability to prepare MEAs from different types of membranes and systems with various kinds and levels of acid doping.

Such process of direct transfer of catalyst layer to the membrane surface is used in case of Nafion membranes (known as DECAL process). Though PBI is widely demonstrated as PEM material, the Decal process with PBI membrane is hitherto not known, for which protection is sought in the current application.

The following examples are given as illustration of the process of the present invention in actual practice which should not be construed to limit the scope of the present invention.

Different Ways of MEA Preparation are:
  Conventional way: GDE (Gas diffusion electrodes) in which the catalyst with ionomers are coated with brush on the gas diffusion layer/carbon paper and hot pressing to the electrolyte membrane
  Sputtering technique: the Pt nanoparticles are directly attached to the membrane surface by sputtering technique with bulk Pt metal as source
  Spray coating: an ink consist of catalyst and ionomer of specific composition is coated on either the gas diffusion layer (GDL) or directly over the electrolyte membrane
  Bar coating: catalyst slurry is coated with desired thickness on the GDL using a doctor blade and the dried electrodes are hot pressed on electrolyte membrane Example 1

10 cm$^2$ of phosphoric acid doped FBI was hot pressed at 125° C. at 2 metric ton pressure for 15 minutes. This was then hot pressed with a thin sheet of Teflon® contain dry layer of catalyst (40% Platinised carbon with Nafion® ionomer) at 140° C. at 2 metric ton pressure for 15 minutes. The Teflon® sheet is peeled off from the membrane, sandwich the membrane with catalyst layer between two Toray® carbon paper and hot press at 140° C. to obtain the MEA Example 2

10 cm$^2$ of phosphoric acid doped PBI was hot pressed at 125° C. at 2 metric ton pressure for 15 minutes. This was then hot pressed with a thin sheet of Teflon® contain dry layer of catalyst (40% Platinised carbon with Nafion® ionomer) at 140° C. at 2 metric ton pressure for 15 minutes. The Teflon® sheet is peeled off from the membrane, sandwich the membrane with catalyst layer between two gas diffusion layers made of carbon cloth and hot press at 140° C. to obtain the MEA Example 3

10 cm$^2$ of phosphoric acid doped PBI was hot pressed at 125° C. at 2 metric ton pressure for 15 minutes. This was then hot pressed with a thin sheet of Teflon® contain dry layer of catalyst (20% Platinised carbon with Nafion® ionomer) at 140° C. at 2 metric ton pressure for 15 minutes. The Teflon® sheet is peeled off from the membrane, sandwich the membrane with catalyst layer between two gas diffusion layers made of carbon cloth and hot press at 140° C. to obtain the MEA

ADVANTAGES OF THE INVENTION

1. Simplified procedure of MEA preparation compared to brush coating method.
2. Direct contact of catalyst with membrane.
3. Lower ohmic resistance due to catalyst layer compared to brush coated MEAs.
4. Low platinum loading on decal MEAs shows better performance hence this method reduces platinum loading in the MEAs.
5. Diffusion of proton to membrane through catalyst layer is very easy.
6. Enhanced performance compared to brush coated MEAs.

We claim:

1. A process for the preparation of a membrane electrode assembly (MEA) comprising:
    a. hot pressing a poly benzimidazole membrane (PBI) doped with phosphoric acid at a temperature of 130° C., at a pressure of about 1.6 tons per square inch for 30 minutes;
    b. hot pressing the membrane as obtained in step (a) again with electrodes at a temperature of 130° C. at about 1.6 tons per square inch for a period of 15 minutes to obtain an electrolyte membrane;
    c. directly transferring a catalyst layer comprising Pt/carbon in the range of 0.15-0.3 mg/cm$^2$ from a nonporous support on to the electrolyte membrane as obtained in step (b) during hot pressing to obtain a membrane electrode assembly (MEA).

2. The process as claimed in claim 1, wherein the non-porous support used in step (c) is selected from the group consisting of Teflon, a polyimide, a polystyrene, and nylon.

3. A process for the preparation of a membrane electrode assembly (MBA) comprising:
    a. hot pressing a poly benzimidazole membrane (PBI) doped with phosphoric acid at a temperature of 160° C., at a pressure of about 3.2 tons per square inch for 30 minutes;
    b. hot pressing the membrane as obtained in step (a) again with electrodes at a temperature of 160° C. at a pressure of about 3.2 tons per square inch for a period of 20 minutes to obtain an electrolyte membrane;
    c. directly transferring a catalyst layer comprising Pt/carbon in the range of 0.15-0.3 mg/cm$^2$ from a non-porous support on to the electrolyte membrane as obtained in step (b) during hot pressing to obtain a membrane electrode assembly (MEA).

4. The process as claimed in claim 3, wherein the non-porous support used in step (c) is selected from the group consisting of Teflon, a polyimide, a polystyrene and nylon.

* * * * *